United States Patent
Böer

[15] 3,704,935
[45] Dec. 5, 1972

[54] LIGHT BEAM DEFLECTION METHOD AND APPARATUS

[72] Inventor: Karl W. Böer, Buck Toe Hills, Kennett Square, Pa. 19384

[22] Filed: Nov. 13, 1970

[21] Appl. No.: 89,302

[52] U.S. Cl.................................350/160 R, 350/161
[51] Int. Cl...............................................G02f 1/32
[58] Field of Search..............................350/160, 161

[56] References Cited

UNITED STATES PATENTS

| | | | |
|---|---|---|---|
| 3,169,163 | 2/1965 | Nassenstein | 350/160 R |
| 2,836,652 | 5/1958 | Sprague | 350/160 R |
| 3,435,228 | 3/1969 | Gordon | 350/161 |

OTHER PUBLICATIONS

Proceedings of the Symposium on Modern Optics. Copyright 1967 by the Polytechnic Press of the Polytechnic Institute of Brooklyn; g. 257–264.

*Primary Examiner*—Ronald L. Wibert
*Assistant Examiner*—V. P. McGraw
*Attorney*—George W. Walker

[57] ABSTRACT

Method and apparatus for variably deflecting a beam of light in a predetermined manner by creating and controllably varying an index of refraction gradient within the medium through which the light beam passes.

34 Claims, 6 Drawing Figures

PATENTED DEC 5 1972

INVENTOR
KARL W. BÖER

BY *George W. Walker*
ATTORNEY

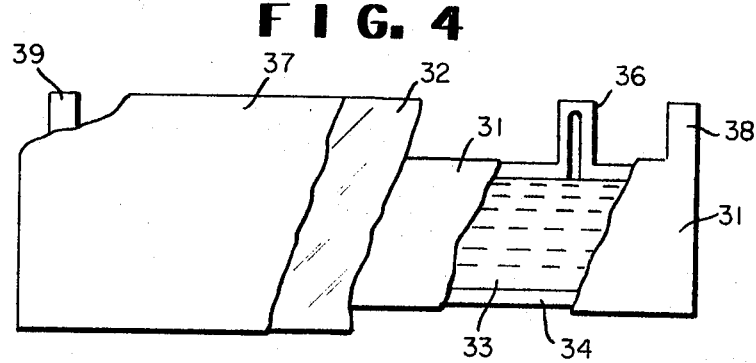
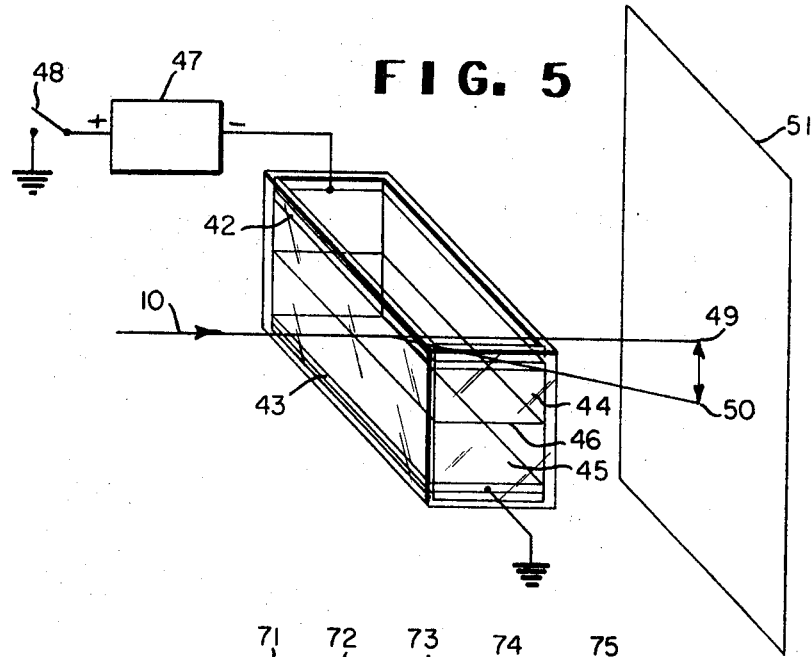
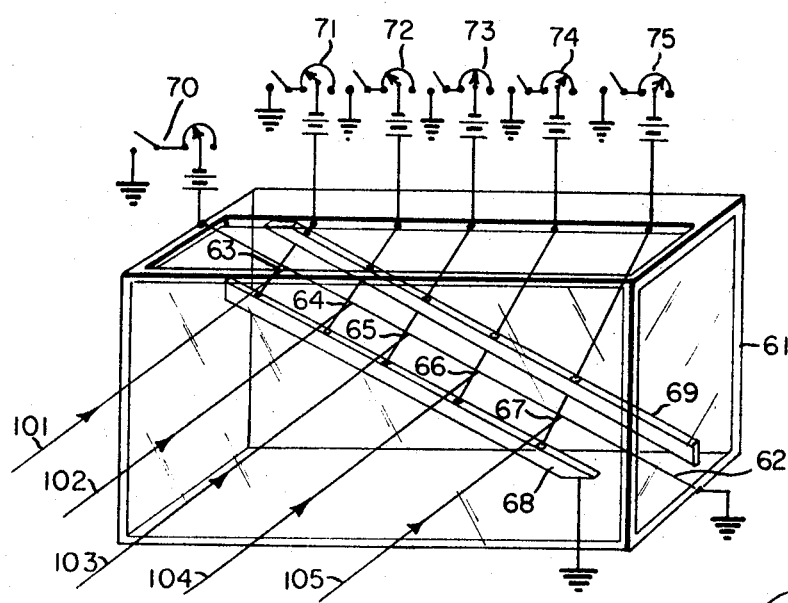

3,704,935

LIGHT BEAM DEFLECTION METHOD AND APPARATUS

BACKGROUND OF THE INVENTION

1. Field of the Invention

This invention relates to method and apparatus for variably deflecting a light beam, generally a focused light beam and, more particularly, to method and apparatus for variably deflecting a light beam in a predetermined manner.

2. Brief Description of the Prior Art

In the past, beams of light have been variably deflected in a predetermined manner by a number of different methods. For example, variable reflectors, such as mirrors arranged to rotate, oscillate, or move in procession, have been operably connected to a mechanism such as a galvanometer, a motor, or a transducer and arranged thereby to utilize electromagnetic, piezoelectric or magnetostrictive forces which cause the mirror to mechanically shift position or tilt at a frequency which is below, at, or above the resonance frequency of the system to deflect beams of light. In addition, certain diffraction elements, such as prisms or a series of prisms, made of materials having an index of refraction which can be homogeneously changed or varied by means, such as an electric field created within the element or a change in the temperature of the element, have been used to deflect beams of light. Furthermore, birefringent deflectors using elector-optical means to rotate the plane of polarization and, a discriminator such as calcite or a Wollaston prism to switch from the ordinary to the extraordinary beam, have been used to deflect light beams. Still further, interference deflectors, such as ultrasonically produced gratings, that is, standing ultrasonic waves created in a material which changes its index of refraction or its optical absorption as a function of pressure, have been utilized to deflect light beams. In this instance, changes in ultrasound frequency cause changes in the angle of deflection. Another example of the above is a slightly wedged optical cavity, the interference characteristics of which are changed by external means. In this instance, the wedge angle variation causes changes in the angle of deflection.

However, all of such methods are relatively expensive and have serious shortcomings. Among the intrinsic and practical limitations of the above method of deflecting light beams are phase-front distortion, optical dispersion, variation of brightness with scan angle, non-linearity of deflection, acoustic ringing, temperature sensitivity, light losses, low resolution and slow response. Although all of these limitations do not apply to all of the above systems, all of the systems have some of the limitations which render them generally unsuitable for many applications.

The principle of variable refractors in an inhomogeneous medium, i.e., in a medium with a spatially changing (or gradient of) index of refraction, is not new. It has long been known that a light beam intersecting such a gradient is deflected towards the direction of higher index of refraction by an angle $\psi$ of approximately $$\psi = L\, dn/dz$$

where $L$ = length of the medium in beam direction, $n$ = index of refraction, $z$ = coordinate normal to the beam, and $dn/dz$ is the gradient of index of refraction.

It is also known that the gradient of the index of refraction in a material can be controlled by means of an external electric field gradient (e.g., via the Franz-Keldysh effect), by inhomogeneous mechanical stress, or by a temperature gradient. The deflection of sunlight passing through the earth's atmosphere when the sun is close to the horizon is a well-known example of light deflection in a medium with a gradient of the index of refraction. Another example is a high intensity light beam (e.g., a coherent type such as a laser beam) passing through a medium with marked absorption in which heat causes peripheral parts of the beam to be conically deflected while the central portion of the beam passes undeflected through the medium, for example, see U.S. Pat. No. 3,434,779. However, none of these methods provide means for controlling the direction of a beam of light by deflection.

Some deflection is observed when a light beam passes through a crystal (e.g., gallium arsenide) which undergoes Joules heating due to its own semiconductivity. However, the deflection angle caused by such a temperature gradient is small (less than 1°), since only small temperature or index of refraction gradients are obtained, and changes of the deflection angle are slow because of the long thermal relaxation of the system (usually larger than 0.1 sec.).

Thus, it has long been desired to have some means of variably deflecting a light beam such as a laser beam throughout a large deflection and that such deflection be possible in several directions, for example, in an x-y pattern. In particular, it has been desired to provide the above capability with a device having a short relaxation time and good control characteristics without appreciable loss of light or resolution.

SUMMARY OF THE INVENTION

The present invention comprises method and apparatus for variably deflecting a light beam in a predetermined manner, and includes a transparent medium through which said light beam passes which medium has an index of refraction which can be varied, and means for creating and varying in a controlled manner an index-of-refraction gradient by a maximum amount of at least 1 cm$^{-1}$, preferably of at least 10 cm$^{-1}$, in at least a portion of the medium through which the light beam passes when said gradient is measured in a direction perpendicular to said light beam. Some embodiments of the present invention include a transparent medium through which said light beam passes, which medium has an index of refraction which can be varied, and means for creating and varying in a controlled manner an index-of-refraction gradient in the medium by an element which transmits heat to the medium including, as said element, a portion of said medium where heat is generated in said portion as will be described below. In one form of the invention, the element is electrically conductive and an electrical power source is included for heating the element. In some embodiments of the invention, the medium is disposed adjacent to a body of optically transparent material or a second element and in some instances is contained thereby where, for example, the medium is in the form of a liquid or a gas. It is preferred that the optically transparent material or the second element and the heating element have a greater coefficient of heat conductivity than the medium so that inhomogeneous heating of said medium is increased and a temperature gradient is maintained therein which can be controllably varied. In some embodiments cooling means are associated with said body of optically transparent material or by said second element for transmitting heat from said medium, for example, by use of a fan, air jet, or refrigeration system.

Restricted embodiments of the apparatus of the invention include two elongate elements capable of transmitting heat to the medium, the elements being disposed in perpendicular and spaced-apart relationship to one another so that each of the elements creates within the medium a substantially independent index-of-refraction gradient which intersects the light beam. Means are associated with each of these elements for separately controlling the temperature of the elements where it is desired to cause the beam to be variably deflected through a raster pattern or otherwise utilized for scanning purposes.

In another embodiment of the invention, the element utilized to transmit heat to the medium is in the form of a flat stratum of electrically conductive material and the medium is disposed between this stratum and a layer of optically transparent material. For obtaining high deflection angles it is preferred that both the stratum and the optically transparent material have a greater coefficient of heat conductivity than the medium. In this embodiment, a second layer of material having relatively low heat conductivity may be disposed in contact with the surface of the stratum opposite the medium and a layer of material having relatively high heat conductivity may be disposed in contact with the surface of the second layer, so that the center plane of the element constitutes a plane of substantial thermal symmetry with respect to heat transmitted from each of its surfaces.

For obtaining high resolution and/or high speed of deflection it is preferred that the medium has the maximum heat conductivity that is possible. Here the material or materials in contact with the flat stratum of electrically conductive material opposite the medium may be omitted.

In other embodiments of the invention, means for creating and varying in a controlled manner the index-of-refraction gradient in the medium comprise means for generating a substantially collimated beam of electromagnetic waves falling within the electromagnetic energy spectrum of at least partial absorption which means direct the collimated beam into the medium whereby it is at least partially absorbed to create heat. In this embodiment, the medium sometimes includes a dopant which influences the degree of absorbency of the collimated beam, and, therefore, the amount of heat created in the medium.

A further embodiment of the apparatus of the present invention includes means for generating a second light beam, e.g., a high intensity light beam, of a different color than the first light beam and for directing the second light beam into the medium, which medium includes a dye dissolved therein which at least partially optically absorbs the second light beam to a greater extent than the first light beam to create a concentrated channel of heat within said medium.

In another embodiment of the invention, the means for creating and varying in a controlled manner an index-of-refraction gradient in the medium comprise means for generating substantially collimated beams of mechanical waves, e.g., ultrasound waves having an energy sufficient to create heat when the waves pass through the medium which means direct the collimated beam into the medium.

In still further embodiments of the apparatus of the invention, the means for creating and varying in a controlled manner an index-of-refraction gradient in the medium comprise means for applying an electrical potential through the medium which potential is sufficiently high to create a current channel through the medium which in turn creates a concentrated channel of heat within the medium.

A still further embodiment of the apparatus of the present invention includes a transparent container, two immiscible liquids disposed in overlying relationship to one another within the container so as to form an interface, one of the liquids containing ions for which the liquid is a solvent and for which the other liquid is a non-solvent, and means for applying an electrical potential through the liquids to create an electric field sufficient to force at least some of the ions from the solvent into the non-solvent so as to form a layer of the non-solvent which has an ion concentration gradient and, therefore, an index of refraction gradient therethrough. The gradient can be varied via variation of the applied voltage. This layer is disposed in the path of a light beam to be deflected. The light beam is in a frequency range in which incorporation of the non-soluble ion into the non-solvent changes its index of refraction.

In those embodiments where a body of optically transparent material is in contact with the medium having an index of refraction that can be varied, and is disposed in the path of said light beam that passes through said medium, it is preferred that both said material and said medium have substantially the same index of refraction at ambient temperatures. Where said medium is disposed within said material it is also preferred that the external surfaces of said body of optically transparent material be shaped so that the light beam passes orthogonally through said external surfaces.

The apparatus of the present invention makes it possible to obtain deflections of relatively large angles (up to about 10° or even higher) and, depending on the desired optical resolution, can be made to have a considerably faster response time (even considerably less than 100 $\mu$ sec). Since the deflection angle achieved by the apparatus of the present invention is substantially independent of the ambient temperature and independent to a large degree of the wavelength of the light (within a wide range of the wavelength, e.g., for visible light) a beam of white light can be deflected intact, i.e., without spectral separation or color registration. The present invention makes it possible to accurately aim a light beam, particularly a laser beam, with low light losses in the deflection device. In addition, the apparatus of the present invention enables beam scanning in one direction or in a x-y pattern in accordance with the invention. Also one light beam can be deflected by means of another light beam due to the effect which the second beam has upon the medium through which the first beam passes.

Although many aspects of the method and the apparatus of the present invention have wide application for many practical purposes, the scanning which is made possible by the apparatus of the present invention finds the greatest application, being useful in conjunction with known processes and apparatus involving line scanning for film recording, raster scan for signal generation, scanning of optical memory devices for read-in, erasure and read-out, optical analog computing, commercial visual display, a periodic scanning for symbol projection, hologram memory, production and tooling, phototype setting, and others. Especially a matrix of this apparatus, for instance, a linear array for simultaneous phototype setting of lines, using a laser beam for each letter can be envisioned.

Additional objects, applications and advantages of the apparatus of the present invention will become apparent from the following detailed description of the appended drawings.

DESCRIPTION OF THE DRAWINGS

FIG. 4 is a top view of an apparatus similar to that shown in FIG. 3 showing parts in section;

FIG. 5 is a perspective view of a still further embodiment of the apparatus of the present invention which is adapted to variably deflect a light beam in the same manner as the apparatus of FIG. 1; and FIG. 6 is an array of embodiments for simultaneous deflection of a series of light beams, e.g., for simultaneous phototype setting of a line of letters.

Referring to FIG. 1, a light beam 10 is directed as by a collimated source or mirrors into a body 11 of optically transparent material. In some instances, the light beam may emanate from a laser. The body 11 has an elongate, substantially cylindrical cavity therein filled with a transparent medium 12 having an index of refraction which can be varied in a manner which will be discussed subsequently. A thin, electrically conductive wire 13 extends along the length of the cavity and is approximately centrally located within the cavity. The wire 13 is connected to a source 14 of electrical potential through a switch 15 so that it becomes heated when the switch 15 is closed. The current through the wire may be varied by use of a rheostat 16. Preferably the element or wire 13 and the body 11 of optically transparent material have a higher coefficient of heat conductivity than the medium 12.

Figure 1:
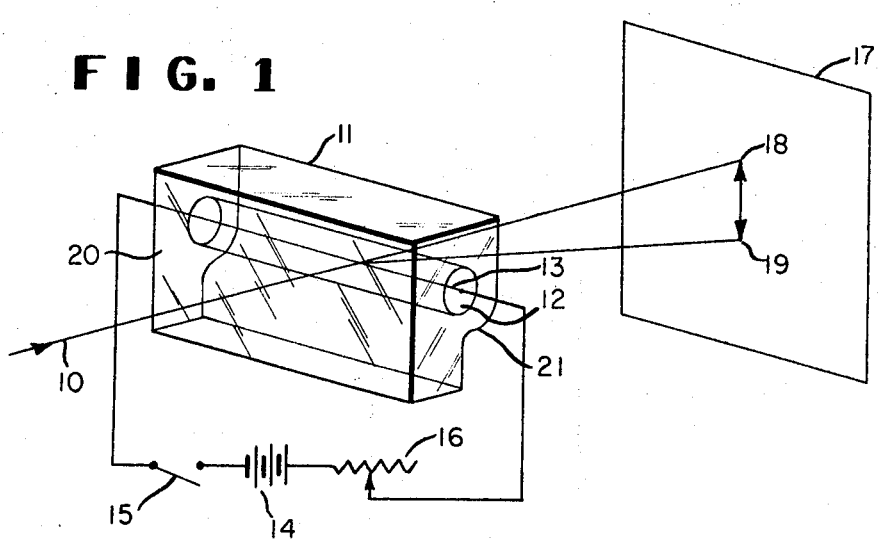
FIG. 1 is a perspective view of one embodiment of apparatus of the present invention which is adapted to variably deflect a light beam in one direction.

The light beam is directed so that it passes through the medium 12 at a point closely spaced from and beneath the wire 13 and when the switch 15 is open the light beam continues from the body 11 and strikes the screen 17 at a point 18. However, when the circuit is closed, the current passing through the wire 13 heats the wire and adjacent portions of the medium 12 to thereby establish and maintain a thermal gradient through the medium from the wire 13 to the body 11. This alters the index-of-refraction of the medium 12 near the wire in which the thermal gradient is established. Therefore, when the light beam 10 passes through the portion of the medium 12 having an index-of-refraction gradient, the light beam is deflected or bent so that it issues from the body 11 and strikes the screen 17 at a point 19. The distance between points 18 and 19 can be varied by changing the temperature of wire 13 and hence changing the temperature gradient in the part of the liquid 12 through which the light beam passes. This can be accomplished by adjusting the rheostat 16. The opening and closing of switch 15 causes the light beam to deflect up and down the line connecting points 18 and 19. Leaving the switch closed and varying the current by use of the rheostat 16 also causes the beam to move along the line between 18 and 19 and the beam can be maintained constant at any point along the line by maintaining the voltage and hence current flow constant.

With respect to the beam of light 10, the body 11 of optically transparent material has an entrance surface 20 positioned to be orthogonal to the direction of the beam and has an exit surface 21 shaped to be orthogonal to the direction of the beam through its angle of deflection.

It is preferred that the index of refraction of both the liquid 12 and the optically transparent material of 11 be substantially the same at ambient temperatures, although this is not essential.

The body 11 can essentially be any transparent material, e.g., glass, but preferably has high heat conductivity as crystals, e.g., sapphire. The liquid 12 can also be any liquid which changes its index of refraction with temperature, as most liquids do. It is preferably a liquid in which this change is rather large, as, e.g., $CCl_4$ or $CS_2$.

Figure 2:
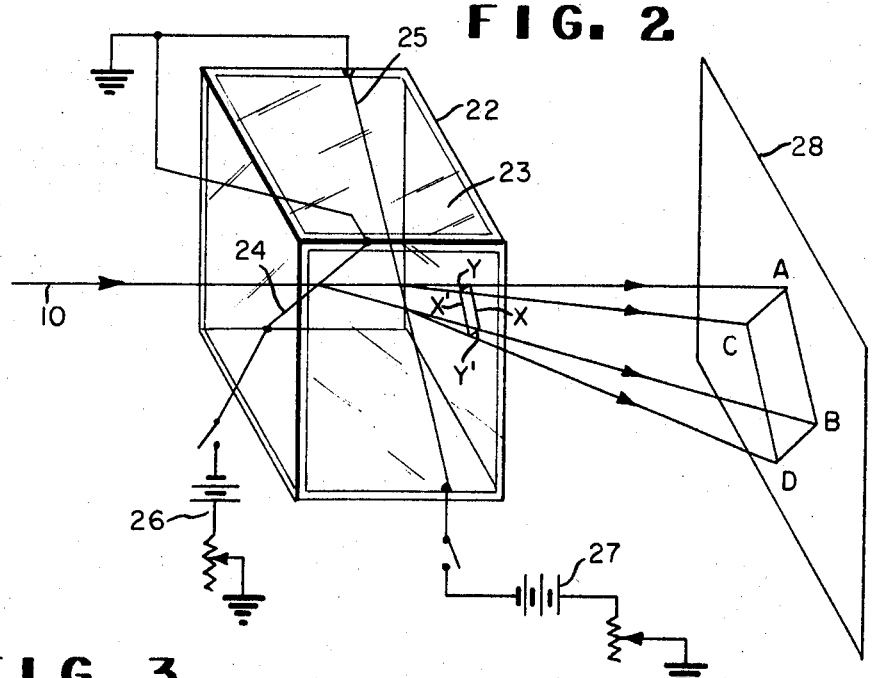
FIG. 2 is a perspective view of another embodiment of apparatus of the present invention which is adapted to variably deflect a light beam in an x-y pattern.

FIG. 2 is a modification of the invention exemplified in FIG. 1 making use of two electric wires which cross at right angles to each other when viewed in the direction of the incoming beam. In FIG. 2 the beam 10 enters the glass tank or container 22 which is filled with the liquid 23, electric wires 24 and 25 are placed so that they are slightly separated one from the other so as not to interact thermally with each other and are at right angles to each other and connected to electrical potential means 26 and 27 respectively that are similar to the means used in FIG. 1. In the drawing the distance between wires 24 and 25, which may typically be of the order of 1 mm, is increased to illustrate how the beam is deflected. In view of the convection created above a heated wire in a liquid, it has been found to be preferable that these wires be positioned at 45° to the horizontal. The light beam 10 is directed to pass just below the point of apparent crossing of the two wires when viewed in the direction of the beam. A current applied to wire 24 thereby heating said wire causes the beam to be deflected downwardly in a plane perpendicular to the axis of wire 24 and parallel to the axis of, but passing just below, wire 25. The magnitude of deflection is represented by the line X which is the line traced by the beam as it emerges from the glass container and travels along line AB on screen 28. When electricity is passed through wire 25 so as to heat same, while not heating wire 24 the light beam will be deflected downwardly in a plane parallel to the axis of wire 24 and perpendicular to the axis of wire 25 and exit from the container along the line Y and travel along line AC on screen 28. If electricity from separate controls is applied to both wires to give the maximum deflection to the beam, and varied separately within this range the beam can be directed to any point within the square bounded by lines X, Y, X' and Y' and hence projected to scan an area A, B, C, D, on the screen 28.

In the apparatus of FIG. 2 the optically transparent medium having the capability of high gradient of temperature and hence gradient of index of refraction is the liquid just below each wire. And the optically transparent material having higher heat transfer is the surrounding liquid which by spreading conduction and by convection removes the heat rapidly from the liquid just below the wire.

Figure 3:
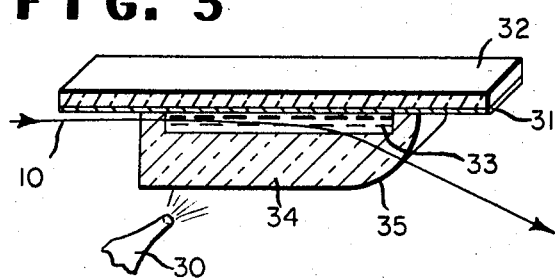
FIG. 3 is a sectioned perspective view taken in a plane of the path of the deflected light beam of a still further embodiment of the apparatus of the present invention which is adapted to variably deflect a light beam in the same manner as the apparatus of FIG. 1.

FIG. 3 represents a modification of FIG. 1 for which in place of wire in a liquid a thin flat layer of metal 31 is used. In FIG. 3 there is an electrically insulating substance 32 which, e.g., may be a layer of glass onto which a thin metal layer 31 is deposited. Below the thin metal layer 31 is a thin layer of a liquid medium 33 confined in a transparent solid material of high heat conductivity acting as a heat sink, such as e.g., a transparent sapphire crystal 34. The liquid medium has preferably the same index of refraction as the crystal. Controlled electric current (similar as in FIGS. 1 and 2 but not shown here) is passed through the metal layer 31, thereby controlling the temperature at the metal-liquid interface hence creating and controlling a gradient of the temperature orthogonal to the plane of the metal layer in the liquid and hence a gradient of the index of refraction in the liquid. Light beam 10 is directed so as to pass in a plane parallel to and just below the metal layer. The light beam will be deflected by this gradient of index of refraction so that it emerges, being bent down by a certain angle from its original direction. By making the exit surface 35 of the crystal 34 an orthogonal trajectory of the deflected beam, defocusing of the beam can be minimized. Optically an airjet 30 or other means can be used to cool the crystal 34. The apparatus of FIG. 3 has the advantage of increasing the speed of deflection of the beam with change in current flow through the metal layer by reducing the thermal relaxation time of the apparatus as compared with the example given in FIGS. 1 or 2, since the metal layer can be a very thin film and also the liquid layer can be rather thin (depending on the optical revolution, typically between 10 and 100 $\mu$m).

It can be advantageous to have the upper part of the device shown in FIG. 3 symmetrical to the centerplane of the metal layer in respect to its thermal properties. This can be done by matching the heat conductivities and thicknesses of layers 32 and 33 and connecting a second heat sink comparable to crystal 34 to the top of layer 32. It is also preferable to keep the thickness of the metal layer 31 and the liquid medium 33 at the minimum. For high speed deflection the liquid 31 can be replaced by a material of higher heat conductivity, as, e.g., a transparent crystal and the heat sink 34 may act via spreading thermal resistance.

FIG. 4 is a sectional top-view of a similar apparatus as shown in FIG. 3, except that the heat sink 37 is shown, which is described above but not shown in FIG. 3. 31 represents the metal layer with protruding electrodes 38 and 39 to the sides to apply the potential. The metal support is 32. 34 identifies the external boundaries of the solid material confining the liquid 33 within the cavity. A capillary 36 extends to one side of the apparatus in order to allow for expansion of the liquid within the cavity.

In the apparatus disclosed in FIGS. 1, 2 and 4 the gradient of index of refraction across the light beam was created by a gradient of temperature created by Joules heating of a transparent medium via a metal wire, band or layer from one side and cooling it via a transparent higher-heat-transferring or higher-heat-conductive material from the opposite side. Means other than by Joules heating of a metal may be used to efficiently create a large temperature gradient, e.g., an electric arc in a gas or a current channel in a semiconductor, or light or ultrasonic energy focused in a medium of low heat conductivity in which the index of refraction changes with temperature. A current channel may be established in any semiconducting transparent medium, as is known to occur in a range of the current-voltage characteristics in which stabilization by an external resistor is required.

In FIG. 5 another apparatus is shown in which the gradient of the index of refraction near the interface 46 of two immiscible liquids 44 and 45 is used to deflect the light beam 10. This gradient of the index of refraction is produced by pulling ions soluble in one liquid, e.g., liquid 45, into the liquid 44 by means of an electric field produced between the metal plates 42 and 43 caused by a regulated high-voltage source 47. When a sufficient voltage is applied by closing the switch 48 ions dissolved in liquid 45 are pulled across the interliquid boundary 46 into liquid 44 and produce a space-charge layer here which prevents further transport of these ions into liquid 44, and create a gradient of ion density just above the boundary 46 through which the light beams 10 is passed. Since the gradient of ions produces a gradient of the index of refraction, the light beam is deflected from point 49 to point 50 on screen 51. With changing applied voltage the ion gradient, hence the angle of deflection, can be varied.

FIG. 6 shows an apparatus which can best be described as a sequence of systems as shown in FIG. 2. In a glass container, 61, one wire, 62, connected to a battery, rheostat and switch unit 70 is crossed, for example, by a number of wires, 63, 64, 65, 66 and 67, which are mounted between a common connector, 68, and an insulating rod, 69, each one connected to separate battery, rheostat and switch units, 71, 72, 73, 74 and 75 respectively. The wires are positioned at 45° to the horizontal axis because of reasons given for FIG. 2. A number of laser beams, 101, 102, 103, 104, and 105, are directed just below each crossing wire and can be deflected simultaneously in one direction by the battery, rheostat and switch unit 70 and independently in one direction by the battery, rheostat and switch units 71, 72, 73, 74 and 75. By this apparatus an alphanumerical array can be set simultaneously line by line. If any one of the light beams is not used for character setting, it can be deflected onto a spot at which a mirror deflects the beam out of the system.

The light of the light beam may be of visible or invisible light or of polychromatic or monochromatic light or of high intensity light, such as a laser beam. The medium in which a gradient of the index of refraction can be created, maintained, and varied, across the width of the light beam includes media such as gases, liquids and solids in which changes of the index of refraction occur with changing temperature, and hence most optically transparent substances. It is preferable that the gases be those under pressure and have an index of refraction considerably greater than one. The liquids include practically any liquid through which the light beam can pass. The solids may be those capable of transmitting the light beam in the thickness used, as, e.g., glasses or transparent crystals as NaCl, CdS, $Al_2O_3$, BeO, etc. It is evident that the transparent medium used whether it be gas, liquid or solid must be capable of allowing for a change of the index of refraction of sufficient magnitude and for some application preferably independent of the wave length of the used light (for white light deflection). For visible light a typical liquid can be simply water or alcohol or any mixture thereof, aqueous solutions of alkali halides, like NaCl, or $CS_2$ and organics as e.g., higher alcanes, alcane halides, as $CCl_4$, ethers, benzene, etc., and mixtures thereof to match the index of refraction with the transparent container.

It is evident from the above descriptions that many variations can be made in the apparatus to accomplish the controlled deflection of the light beam.

DETAILED DESCRIPTION OF THE PREFERRED EMBODIMENTS

Embodiment I

A helium-neon laser light beam is focused to a narrow diameter less than 0.1 millimeters just below a thin horizontal wire in a transparent container, similar to container 22 in FIG. 2, filled with carbontetrachloride. The wire is made of Nichrome and is 0.3 mm in diameter. When this wire is heated by about 2 ampere (Joules heating) the light beam is deflected downward about 15°. The time of deflection is about 0.2 seconds. The beam divergence is about 1° yielding 15 resolution elements over the deflected range.

Embodiment II

Using the apparatus in FIG. 2 where the liquid 23 is carbon tetrachloride in a container 22 made of glass, the heating wires 24 and 25 are of Nichrome and are 0.3 millimeter in diameter, and the space between the wires about 1 millimeter, a helium-neon laser light beam 10 is focused to less than 0.1 millimeter diameter just below the apparent crossing of the two wires when viewed in the direction of the beam. By independent heating of the two wires and by varying the current flow from zero to approximately 2 amperes the beam was directed to any desired point in a 15° by 15° quadrant on the screen, hence the controlled scanning of the area can be obtained. By inserting an x-y array of 15 × 15 lenses that cover the area scanned by the beam, the beam can be focused to small spots jumping from spot to spot as the beam moves from lens to lens. With a number of light beam systems using an x-y array of lenses for each beam and with the focus of the light beam of one system being slightly shifted from that of the other, a close spacing of a large number of dots can be achieved, composing for example a television-like picture.

Embodiment III

The metal wire 13 in FIG. 1 is replaced by a helium-neon laser beam focused at a small angle at the center-plane of the cavity (normal to the laser beam) and a small amount of blue dye is added to the liquid so as to produce just enough optical absorption for the laser beam to cause some heating of the liquid, the light beam 10 (FIG. 1) of less intensity then the laser beam, hence itself causing no marked heating, orthogonal to the laser beam and passing just below the laser beam is deflected downward. The angle of deflection increases as more heat is produced by the laser, e.g., by better focusing or increasing the laser energy.

An increase of the angle of deflection can also be achieved by moving the focal point of the laser closer to light beam 10, e.g., by deflection of the laser beam toward beam 10. A very small motion of the laser beam can result in a large-angle deflection of beam 10; hence giving a marked deflection-angle amplification.

When the light beam 10 is itself a laser beam its color should be such that it will not be markedly absorbed by the liquid.

Embodiment IV

Benzene and water having dissolved therein samarium chloride are put in a cuvette or optical trough and an electric field is applied orthogonal to the surface boundary between the two liquids as shown in FIG. 5. Samarium ions in the water are forced by the electric field to penetrate the benzene. The degree of penetration depends on the strength of the field. It was found that in the neighborhood of the eigen absorption of these ions the index of refraction in the benzene changes close to the boundary of the two liquids, and a laser light beam of similar frequency as the eigen absorption passing through this area parallel to the boundary of the two liquids is deflected. The angle of deflection can be controlled by the strength of the electric field.

Embodiment V

A laser beam is split via semitransparent mirrors into five beams and each of these beams is focused below crossing wires in an embodiment similar to the one of FIG. 2 and as shown in FIG. 6. The Nichrome wires of 0.3 mm diameter are positioned in a transparent glass container filled with $CCl_4$. By variation of the current through the wire 62 every laser beam can be deflected away from the wire toward the lower left in this figure. By independent variation of the current through each wire 63, 64, 65, 66, 67 each laser beam 101, 102, 103, 104 and 105 can be deflected independently away from each of said wires toward the lower right. By proper spacing there is no overlap of the deflected beams; each one can be used to write one character line by line.

While particular embodiments of the present invention have been shown and described, it is apparent that changes and modifications may be made therein without departing from the invention in its broader

I claim:

1. A method for variably deflecting a light beam in predetermined manner, comprising directing the light beam into a transparent medium which has an index-of-refraction which can be varied, and contacting a portion of said medium with a heated element to create and vary in a controlled manner an index-of-refraction gradient by a maximum amount of at least 1 cm$^{-1}$ when measured in a direction perpendicular to said light beam, within a portion of said medium through which said light beam passes.

2. A method according to claim 1, including conducting varying amounts of electrical current through said heated element to change its temperature so as to vary said index-of-refraction gradient.

3. A method according to claim 1, including contacting a portion of said medium spaced from said heated element with a second element having relatively high heat conductivity and a lower temperature than said heated element so as to remove heat from said medium in order to create a larger index-of-refraction gradient therein.

4. Apparatus for variably deflecting a light beam in a predetermined manner, comprising a transparent medium through which said light beam passes, said transparent medium having an index of refraction which can be varied, and an element which transmits heat to said medium for creating and varying in a controlled manner an index-of-refraction gradient by a maximum amount of at least 1 cm$^{-1}$ when measured in a direction perpendicular to said light beam, in at least a portion of said medium through which said light beam passes.

5. Apparatus according to claim 4, wherein the transparent medium is a solid, a liquid, or a compressed gas.

6. Apparatus according to claim 4, wherein said element is electrically conductive, and, there is an electric power source for heating said element.

7. Apparatus according to claim 4, wherein the element has a heat conductivity at least four times greater than the heat conductivity of said medium.

8. Apparatus according to claim 4, including a body of optically transparent material through which said light beam passes, and wherein said medium is disposed within said body of optically transparent material and in the path of said light beam, and said element which transmits heat to said medium disposed within said medium and spaced from said body of optically transparent material, whereby an index-of-refraction gradient is established which intersects said light beam.

9. Apparatus according to claim 8, wherein said medium has the shape of an elongate column having a substantially uniform cross-section along its length, and said element is disposed within said medium substantially along the elongate centroidal axis of said column.

10. Apparatus according to claim 8, wherein said body of optically transparent material and said element have a greater coefficient of heat conductivity than said medium, whereby said apparatus effects sustained and pronounced inhomogeneous heating of said medium and maintains a temperature gradient therein which can be controllably varied.

11. Apparatus according to claim 8, including cooling means associated with said body of optically transparent material for transmitting heat therefrom.

12. Apparatus according to claim 8, including means for controlling the temperature of said element.

13. Apparatus according to claim 8, wherein said element is electrically conductive, and there is an electrical power source for heating said element.

14. Apparatus according to claim 13, including control means operably connected to said electrical power source and adapted to vary the temperature of said element in a predetermined manner.

15. Apparatus according to claim 8, wherein, there are two elongated elements capable of transmitting heat to said medium, said elements being disposed in perpendicular and spaced-apart relationship to one another, each of said elements creating within said medium a substantially independent index-of-refraction gradient which intersects said light beam.

16. Apparatus according to claim 15, including means associated with each of said elements for separately controlling the temperature of said elements.

17. Apparatus according to claim 15, wherein said elements are electrically conductive, and said means include an electrical power source associated with each of said elements for heating said elements.

18. Apparatus according to claim 17, including control means operably connected to said electrical power source and adapted to separately vary the temperature of each of said elements in a predetermined manner.

19. Apparatus according to claim 15, wherein said two heating elements are disposed at an angle of 45° to the horizontal and create separate spaced-apart index of refraction gradients below themselves, respectively, in portions of said medium through which said light beam successively passes.

20. Apparatus according to claim 5, including a layer of an optically transparent material disposed adjacent to said medium and opposite said element.

21. Apparatus according to claim 8, wherein said body of optically transparent material has an index of refraction at ambient temperature which is substantially equal to the index of refraction of the adjacent part of said medium at ambient temperature.

22. Apparatus according to claim 20, wherein said element and said layer of optically transparent material have a greater coefficient of heat conductivity than said medium, whereby said apparatus effects sustained substantial inhomogeneous heating of said medium and maintains a temperature gradient therein which can be controllably varied.

23. Apparatus according to claim 20, including cooling means associated with said layer, of optically transparent material for transmitting heat therefrom to a remote point.

24. Apparatus according to claim 4, wherein said element comprises a flat stratum of electrically conductive material, and wherein said medium is a thin layer deposed between said stratum and a body of high heat conductivity, said apparatus being disposed so that said light beam passes through at least a portion of said medium.

25. Apparatus according to claim 24, wherein said body of high heat conductivity is optically transparent material and has external surfaces through which said light beam passes shaped so that the light beam passes orthogonally through said external surfaces.

26. Apparatus according to claim 24, including a second layer of material having relatively low heat conductivity disposed in contact with the surface of said element opposite said medium, and a layer of material having relatively high heat conductivity disposed in contact with the surface of said second layer, whereby the center-plane of said element constitutes a plane of substantial thermal symmetry with respect to heat transmitted from each of its surfaces.

27. Apparatus according to claim 4, wherein said element which transmits heat to said medium comprises means for generating a substantially collimated beam of electromagnetic waves falling within the electromagnetic energy spectrum of at least partial absorption in said medium and said means directs said collimated beam into said medium whereby it is at least partially absorbed to create heat.

28. Apparatus according to claim 27, wherein said medium includes a dopant which influences the degree of absorbency of said collimated beam, and, therefore, the amount of heat created in said medium.

29. Apparatus according to claim 27, wherein said collimated beam comprises high-intensity light.

30. Apparatus according to claim 4, wherein said element which transmits heat to said medium comprises means for generating a substantially collimated beam of mechanical waves having a frequency and amplitude sufficient to create heat when said waves pass through said medium, said means directing said collimated beam into said medium.

31. Apparatus according to claim 30, wherein said collimated beam is ultrasound.

32. Apparatus according to claim 4, wherein said element which transmits heat to said medium comprises means for applying an electrical potential through said medium, which electrical potential is sufficiently high to create a current channel through said medium, said current channel creating a concentrated channel of heat within said medium.

33. Apparatus according to claim 4, wherein said element which transmits heat to said medium comprises means for generating a second light beam of a different color than the first light beam and for directing it into said medium, and said medium includes a dye dissolved therein which at least partially optically absorbs said second light beam to a greater extent than said first light beam to create a concentrated channel of heat within said medium.

34. Apparatus for variably deflecting a light beam in a predetermined manner, comprising a transparent container, two immiscible liquids or solids disposed in overlying relationship to one another within said container so as to form an interface, one said liquid or solid containing ions for which that liquid or solid is a solvent and for which the other liquid or solid is a non-solvent, means for applying an electrical potential across said liquids or solids substantially orthogonal to said interface so as to create an electric field sufficient to force at least some of said ions from said solvent into said non-solvent to form a layer of said non-solvent which has an ion-concentration gradient and therefore an index-of-refraction gradient therethrough, and means for directing a light beam into said layer of non-solvent, parallel to and near said interface, so that said light beam will be deflected by the index-of-refraction gradient created in said non-solvent.

* * * * *